United States Patent [19]

Rubin

[11] Patent Number: 4,476,381

[45] Date of Patent: Oct. 9, 1984

[54] PATIENT TREATMENT METHOD

[76] Inventor: Martin I. Rubin, 3218 Pauline Dr., Chevy Chase, Md. 20815

[21] Appl. No.: 351,863

[22] Filed: Feb. 24, 1982

[51] Int. Cl.³ .............................................. G06K 5/00
[52] U.S. Cl. ................................... 235/375; 235/385; 235/491
[58] Field of Search ........................ 235/375, 376, 385

[56] References Cited

U.S. PATENT DOCUMENTS

| | | | |
|---|---|---|---|
| 3,526,125 | 12/1967 | Gilford et al. | 235/487 |
| 3,656,473 | 5/1972 | Sodickson et al. | 235/487 |
| 3,831,006 | 8/1974 | Chaffin et al. | 235/375 |
| 3,848,112 | 11/1974 | Weichselbaum et al. | 235/375 |
| 4,164,320 | 8/1979 | Irazoqui et al. | 235/375 |
| 4,180,204 | 12/1979 | Koenig et al. | 235/385 |

Primary Examiner—A. D. Pellinen
Assistant Examiner—Robert Lev

[57] ABSTRACT

A patient treatment method and system facilitates automated administration of the treatment of a patient, including establishing a direct linkage, at all stages of treatment, between the patient, on the one hand, and tests performed on the patient, specimens taken from the patient, and medication and services administered to the patient, on the other hand. The patient treatment method and system includes a patient identification method which provides the patient with a wrist bracelet which not only identifies the patient, but also facilitates generation, at various stages of treatment, of labels for identification of specimen containers containing specimens taken from the patient. The patient treatment method and system also includes a medication verification method and device, by means of which the identity of the patient receiving medication is validated as coinciding with the identity of the patient for whom the medication is intended. The patient treatment and method system also includes a specimen analysis system and method for testing and analyzing specimens contained in respective specimen containers sequentially moved into an aspiration position, concurrently with scanning identifying indicia on each container, as the container is moved into the aspiration position, so as to concurrently provide test data and identification data to a processor. Finally, each specimen container is provided with an extension device holding identifying indicia relating to the identity of the patient from whom the specimen was taken.

7 Claims, 17 Drawing Figures

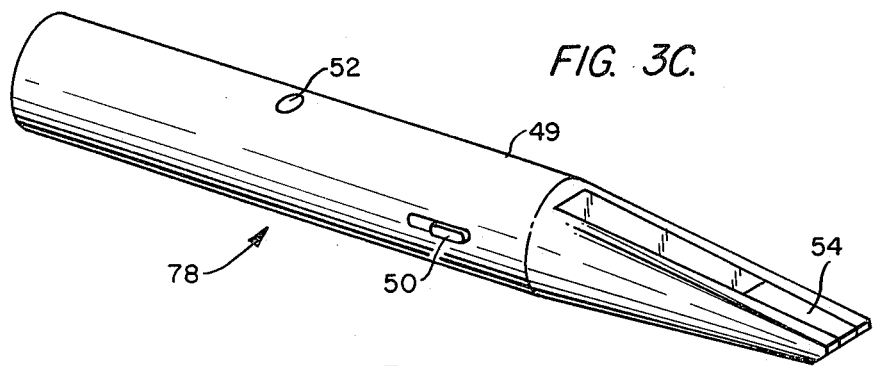
FIG. 3C.
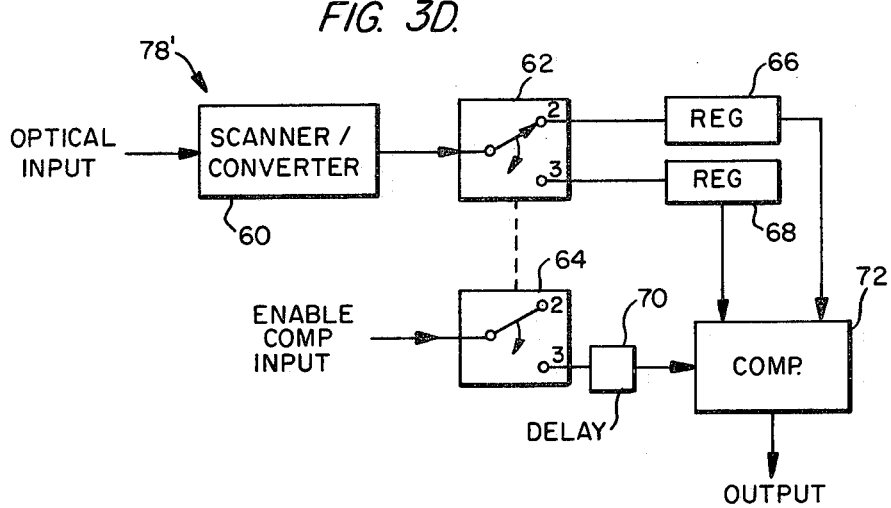
FIG. 3D.
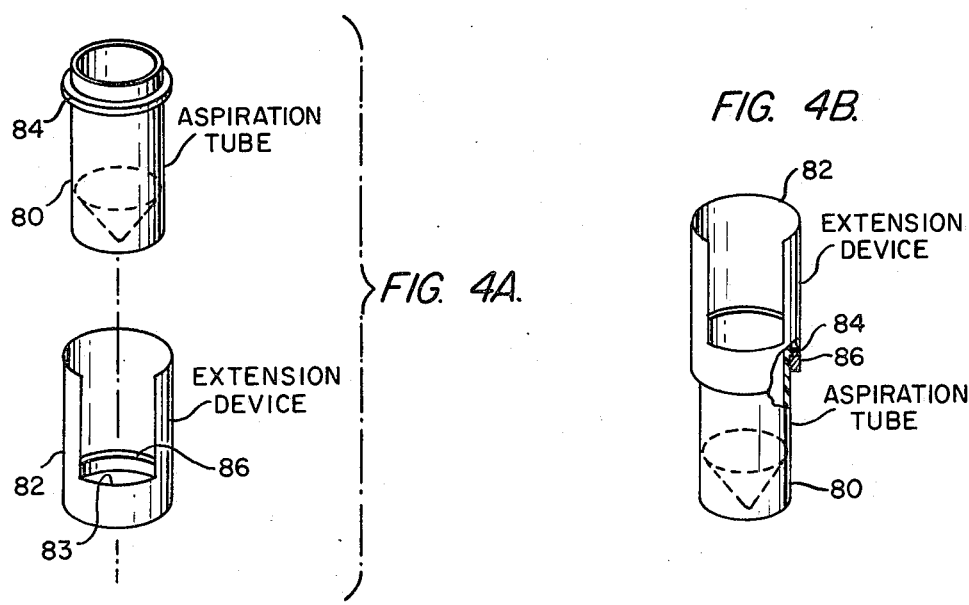
FIG. 4A.
FIG. 4B.

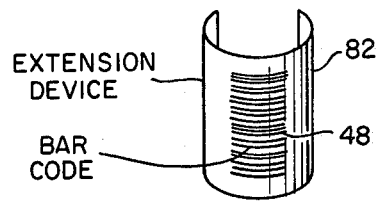
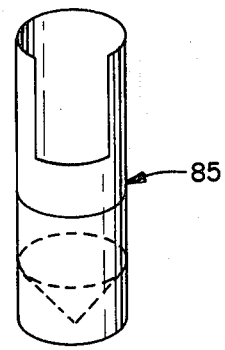
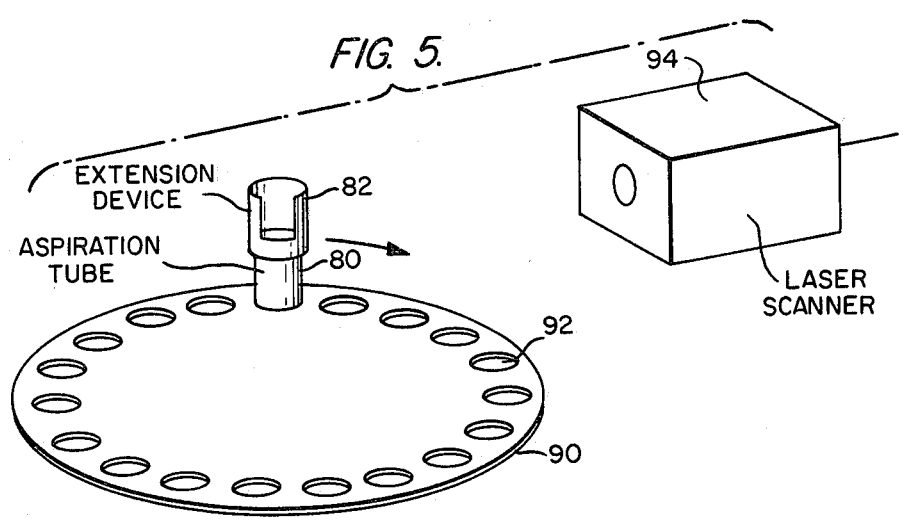
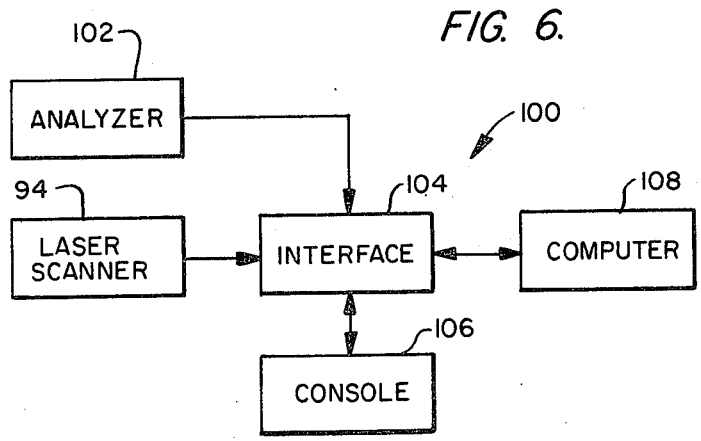

PATIENT TREATMENT METHOD

DESCRIPTION

1. Technical Field

The present invention generally relates to a patient treatment method and system, and more particularly to a patient identification method, medication verification method and device, and specimen analysis system and method for use in physicians offices, clinics, and a hospital environment for treating patients, and for ensuring accurate linkage between the identity of the patient, specimens taken from the patient, medication administered to the patient, services provided for the patient and specimen analysis conducted with respect to specimens taken from the patient.

2. Background Art

Various identification, verification and specimen analysis systems and methods have been employed in the medical environment for the purpose of rendering rapid, accurate and efficient treatment to patients. However, as discussed below, such methods and systems which have been employed with respect to patient identification, verification, and specimen analysis have presented certain disadvantages.

For example, prior art patient identification methods and systems have sought a linkage between the identity of the patient, on the one hand, and the various activities conducted with respect to that patient (medication administration, taking of specimens, etc.), on the other hand. According to one method or technique, disclosed in U.S. Pat. Nos. 3,656,247 and 3,965,589, coded plates attached to an identification bracelet or wristlet worn by the patient are employed. The coded plates are used with pressure-sensitive labels, also carried by the patient in his or her bracelet or wristlet, for the purpose of creating, on the spot, labels carrying identifying information relating to the identity of the patient.

A signficant disadvantage of such a method or technique resides in the fact that the method or technique requires the labels to be stored, in some manner, within the patient's bracelet or wristlet so as to be readily available for imprinting with the identification information. If the supply is stored elsewhere there is an acknowledged and real danger in that the label for one patient may be misapplied to another. A further disadvantage resides in the fact that, when imprinting of a label is required, it is necessary for the doctor or nurse, or other attendant, to place the coded plate in another apparatus, along with the pressure-sensitive label, so as to imprint the label using the coded plate. That is to say, an additional apparatus is necessary in order to obtain an imprinted label using the coded plate. Moreover, a still further disadvantage resides in the fact that, with respect to a long-term patient, the pressure-sensitive labels will undoubtedly be used up, and it is therefore necessary for someone to keep track of the supply of the pressure-sensitive labels in the bracelet or wristlet worn by the patient, and to replenish the supply when necessary.

Other techniques or methods employed in the prior art call for identification bands to be attached to the wristlet worn by the patient, an example of such method or technique being disclosed in U.S. Pat. No. 3,645,023. Such method or technique, however, is burdened by the disadvantage that there is no reproduction capability, that is, there is no capability of generating labels using the identification band. Thus, an entirely separate and additional process is needed in order to generate labels for marking specimen containers containing specimens taken from the patient, or medicine containers containing medicine to be administered to the patient.

In the general area of hospital treatment of patients, significant improvements have been made in recent years in the particular area of specimen analysis, that is, analysis of specimens (blood, urine, etc.) taken from the patients in the course of treatment. Such improvements have included the employment of computers and computer systems, in conjunction with conventional specimen analyzers, for the purpose of receiving and possessing data provided by the specimen analyzers as a result of performance of analytical tests on the specimens presented to the specimen analyzer.

In conjunction with the adoption of such improved specimen analysis techniques, efforts have been directed to the provision, to the computer or computer system, of identification information relating to the identity of the patient to whom the specimen pertains, such identification information being provided concurrently with the analytical test results to the computer or computer system. For example, U.S. Pat. No. 4,133,642 discloses a system or arrangement wherein a magnetic tape associated with the specimen carries identification information, and wherein the magnetic tape is read by an appropriate magnetic tape reader, in conjunction with analysis of the specimen, the specimen results and the identification information being provided in parallel to the computer system. However, such an arrangement possesses disadvantages; for example, the system is bulky and cumbersome, in that it requires the use of relatively inefficient and outdated magnetic tape reading equipment, as contrasted with the more advanced and efficient contemporary techniques (for example, bar code scanners, and the like). More specifically, a primary disadvantage resides in the fact that the employment of such a technique imposes the requirement of providing additional equipment or hardware for encoding the magnetic tape with the identification information. Moreover, since the magnetic tape cannot be prepared directly from the patient's identification wristlet or bracelet, the chance of error exists in terms of affixing the wrong magnetic tape identifier on the specimen container. That is to say, there is no direct linkage between the identity of the patient and the identifying magnetic tape. An additional significant disadvantage of this system is that in the event of failure in the fidelity of the magnetic tape there is no backup mechanism for linkage of the specimen and the patient.

Still another patent, U.S. Pat. No. 3,832,135, discloses an optical character recognition (OCR) system which optically detects and encodes a character associated with the specimen container as the specimen is subjected to the analysis procedure. Such a system, however, suffers from the same disadvantage previously described with respect to the magnetic tape identification technique, that is, there is no direct linkage between the identity of the patient and the characters being optically detected since there are no means provided for producing the OCR label directly from the identification bracelet or wristlet of the patient at the bedside.

Yet a further patent, U.S. Pat. No. 3,916,157, discloses the use of an identifying tab on an upper portion of a specimen carrier, and such arrangement, besides being cumbersome, also has the disadvantage of providing no direct correlation or linkage between the identity of the patient and the specimen within the specimen container. A common difficulty of previous systems proposed for the solution of the problem of positively linking the patient and the services to be provided in a medical environment, is their lack of general applicability to the broad spectrum of such services and the multiplicity of the documents and containers utilized.

DISCLOSURE OF INVENTION

The present invention relates generally to a patient treatment method and system, and more particularly to a patient identification method, a medication verification method and device, and a specimen analysis system and method. More specifically, the invention pertains to a patient treatment method and system which, throughout all stages of treatment (including entry of the patient into the medical environment, performance of various tests, analysis of the specimens being tested, administration of medication, and so forth), maintains a direct linkage between the identity of the patient and the particular procedure being conducted (that is, the specimen being tested or the medication being administered).

In a hospital or related environment the patient identification method of the present invention comprises a unique and novel technique for initially (upon the patient's first submitting himself or herself to the doctor or the hospital for treatment) establishing the identity of the patient, providing the patient with a means for identifying the patient (such means being in the form of a wristlet or bracelet worn by the patient), and further providing for the patient a means by which the hospital or doctor, or other attendant, can generate identifying labels for affixation to blood or other specimen containers, as well as perform a validation procedure to confirm that a particular medication is to be administered to the patient or a particular test is to be performed on the patient.

The invention further encompasses a medication verification method and device, and more particularly a method and device by means of which an identifying label on a medication container can be electronically scanned, an identifying tag on the wrist bracelet of the patient can be electronically scanned, and the results of these two scanning procedures can be electronically compared so as to confirm (validate) or deny (invalidate) the fact that the particular patient is to receive the particular medication. In accordance with the invention, the device provides a visual or audible valid/invalid indication to the user of the device. Moreover, it is to be understood that the device could be used for the purpose of scanning and identifying label or indicia on a hospital test request, so as to confirm the fact that the particular patient is to undergo the particular test in question.

The invention also relates to a specimen analysis system and method, by means of which specimens taken from various patients are sequentially analyzed, while, at the same time, each specimen container is electronically scanned as its particular specimen is being analyzed to develop identification information, identifying the particular patient to which the specimen pertains, the analysis results and the identification data being concurrently forwarded to a computer or computer system. Thus, a direct linkage is once again provided between the identification of the patient to whom the test was administered to develop the particular specimen, and the test results derived as a result of analysis of the particular specimen.

In conjunction with the provision of a novel specimen analysis system and method, the invention still further relates to the provision of a device, either integral with or assembled to a specimen container, for carrying identifying indicia.

Therefore, it is an object of the present invention to provide a patient treatment method, and system, and more particularly a method and system wherein a direct linkage between the identity of the patient and the particular procedure being carried out is maintained at all times.

It is an additional object of the present invention to provide a patient identification method, wherein the patient is provided, upon initial contact with a doctor or entry into the medical environment, with both an identifying wristlet or bracelet to be worn by the patient during the entire course of treatment in a hospital or related facility and, at the same time, a means by which the doctor, the nurse, or other attendant may create or generate, on the spot, as required, labels for affixation to containers to identify specimens (blood, urine, etc.) taken from the patient.

It is an additional object of the present invention to provide a medication verification method and device, by means of which a rapid, on-the-spot determination can be made as to whether or not a particular patient is to receive a particular medication.

It is an additional object of the present invention to provide a specimen analysis system and method, by means of which rapid and automated analysis of specimens can be carried out in conjunction with concurrent provision, via automated techniques, of identifying information to a computer or computer system which concurrently receives the date representing the results of the specimen analysis.

It is an additional object of the present invention to provide a device, either integral with or assembled to a specimen container, for carrying identifying indicia.

The manner in which these and other objects are accomplished by the present invention will become clear from the following detailed description of a preferred embodiment.

BRIEF DESCRIPTION OF DRAWINGS

FIGS. 3C and 3D depict the medication verification device of the present invention.

FIGS. 4A–4D illustrate an extension device for a specimen container or aspiration tube in accordance with the present invention. It is within the scope of the present invention that FIG. 4B may be a homogeneous integral unit. This is illustrated in FIG. 4D.

FIGS. 5 and 6 illustrate the specimen analysis method and system of the present invention.

BEST MODE FOR CARRYING OUT THE INVENTION

Figure 1A:
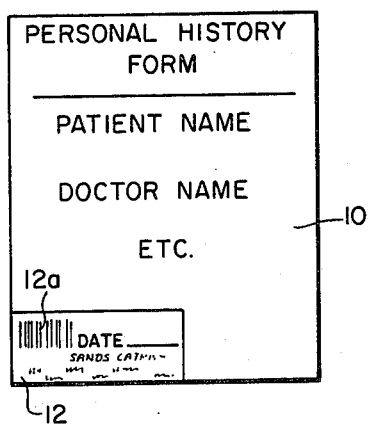
FIGS. 1A and 1B are schematic diagrams, illustrating the patient identification method of the present invention.
Figure 1B:
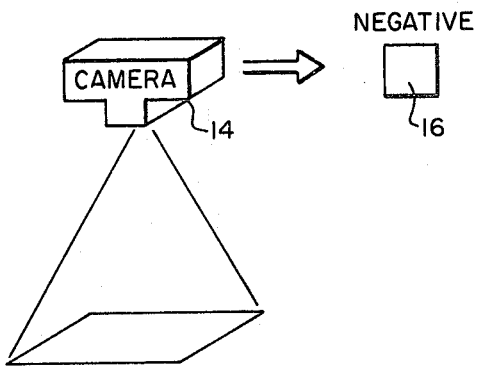

FIGS. 1A–1B illustrate the patient identification method of the present invention.

Specifically, when the patient first visits the doctor or hospital, it is typical for the patient to be required to fill out a personal history form. Such personal history form usually includes the patient's name, the doctor's name, and any other personal or medical information relating to the patient as might be required in the course of treatment by the doctor or at the hospital.

FIG. 1A shows a personal history form 10 which is provided in accordance with the present invention. Specifically, the personal history form 10 includes a portion 12 which contains a bar-code identifier (to be assigned to the particular patient), as well as other information relating to the patient. More specifically, upon visiting the doctor or the hospital for the first time, the patient not only fills out the standard portion of the personal history form, but also provides information which may then be typed or printed into the special portion 12 of the personal history form 10. Each personal history form 10 will have a pre-printed bar-code in the portion 12, and the portion 12, once information is typed or printed therein, will form an identifying means fixed to a wrist bracelet worn by the patient, and which also can be utilized (in a manner discussed below) to reproduce labels for affixation to specimen containers, or the like, relating to the particular patient.

Continuing with a description of the patient identification method, referring to FIGS. A1 and 1B, once the patient fills out the personal history form, and once the necessary information is inserted into the special portion 12 thereof, a camera 14 can be employed to photograph the special portion 12, producing a negative 16.

Figure 1C:
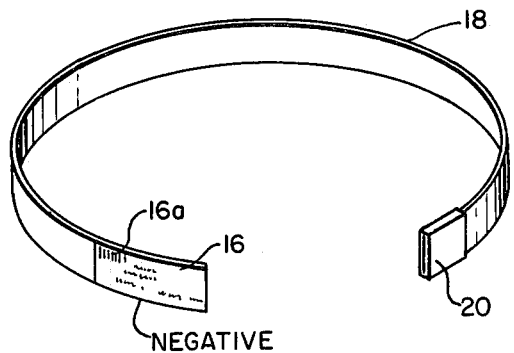
FIG. 1C depicts a wrist bracelet with associated identifying means of the present invention.

Referring to FIG. 1C, the negative 16 may in accordance with the patient identification method of the present invention be utilized directly to generate labels and/or be affixed by any suitable means (such as adhesive bonding) to a conventional wrist bracelet 18, having a suitable conventional clasp 20. By means of the clasp 20, the wrist bracelet 18, together with the identifying negative 16, can be fixed to the wrist of the patient. Use of the negative 16 as a master identification allows the generation of labels for ambulatory patients and in the "in-patient" setting of the hospital allows the generation of labels to affix to order forms, other documents and to containers. It allows for the preparation of labels at various sites in the hospital (e.g., pharmacy, nursing stations, diet kitchen, radiology) from copies of the negative which would be distributed to such sites when a patient is admitted to the hospital. Thus, for example, the pharmacy would be able to label a drug container for the specific patient. This step allows the contemplated check of the drug prepared for the patient by the pharmacy with the identity of the patient as mechanically read by scan of the patient wrist bracelet and comparison with the labeled drug container.

In many instances, upon the patient first visiting the doctor or first entering the hospital, not only is a personal history taken and entered on a personal history form, but also an initial clinical evaluation is made, and the doctor conducting the evaluation makes certain recommendations relative to tests which are needed; for example, evaluation of the patient might indicate the need for blood tests or urinalysis. Accordingly, such tests would be administered to the patient on the initial or subsequent visit to the doctor or initial entry and subsequent stay in the hospital, and some means must be provided for linking the specimen to the particular patient.

Figure 1D:
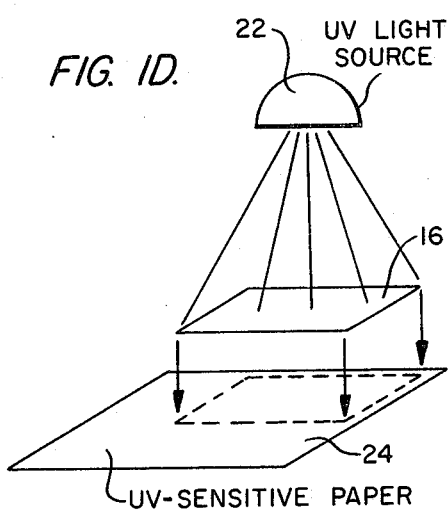
FIG. 1D is a diagram illustrating that aspect of the present invention by which the identifying means which can be associated with the wrist bracelet is employed to generate patient-identifying labels.
Figure 1E:
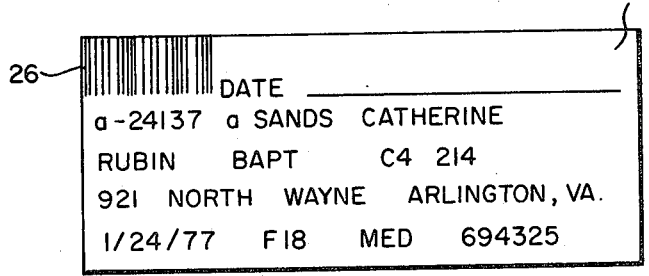
FIG. 1E illustrates a patient-identifying label prepared in accordance with the patient identification method of the present invention.

Therefore, in accordance with the inventive patient identification method, referring to FIGS. 1C and 1D, the negative 16 can be utilized in conjunction with an ultra-violet (UV) light source 22 and UV-sensitive paper 24 to generate a label for affixation to the specimen container. More specifically, as shown in FIG. 1D, the negative 16 is placed in superimposition relationship with respect to the UV-sensitive paper 24, and the negative 16 and paper 24 are exposed to the UV light provided by the source 22. This translumination procedure results in the production of a label 24, as seen in FIG. 1E, which label 24 contains all required personal information summarized on the negative 16, as well as the bar-code identifying information 26.

Figure 1F:
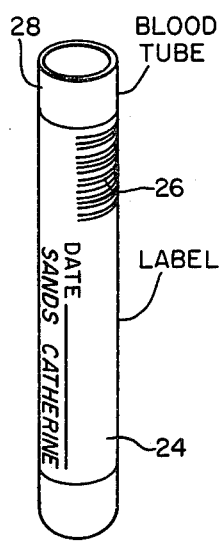
FIG. 1F illustrates the patient identification label, as prepared in accordance with the patient identification method of the present invention, affixed to a container (e.g., a blood tube).

Moreover, according to a further feature of the invention, it is preferable that the label 24 be of the type having an adhesive backing, so that, as illustrated in FIG. 1F, the label 24 can be affixed easily to a blood tube 28, other container, or document. In this manner, the container 28 is provided with a label 24 having a summary of identifying information printed thereon, and also including a bar-code identifying portion 26, the latter corresponding to the bar-code identifying portion 16a appearing on the negative 16 affixed to the wrist bracelet 18 of FIG. 1C worn by the patient. Thus, direct linkage between the identity of the patient and the specimen withdrawn from the patient and placed in a container 28 (FIG. 1F) is achieved in accordance with the patient identification method of the present invention.

Figure 2:
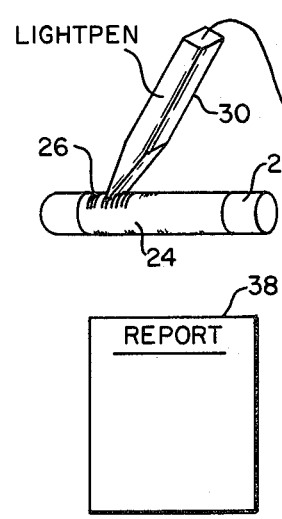
FIG. 2 illustrates one portion of the specimen analysis method and system of the present invention.
Figure 2:
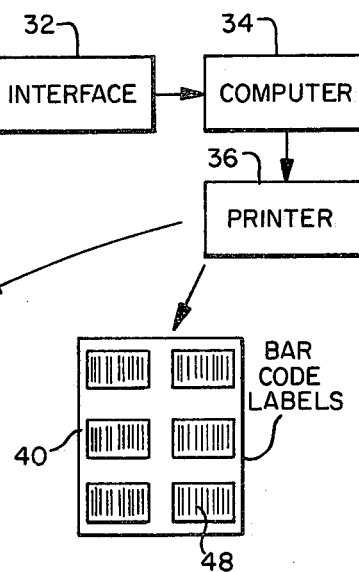

FIG. 2 illustrates one portion of the specimen analysis method and system of the present invention. As seen therein, the specimen analysis system includes a light pen 30 for scanning the bar-code identifier 26 on the label 24 affixed to the container 28, or document and also includes an interface 32, computer 34, and printer 36.

In operation, once the specimen container (for example, blood tube) 28 and/or document is taken to the laboratory for analysis of the specimen, as a first step, the laboratory personnel employ a light pen 30 for scanning the bar-code identifier 26 on the tube 28 and/or labeled document. By conventional data processing techniques, this scanned information is provided to an interface 32, and is then converted into digital form for provision to the digital computer 34. Once the computer 34 has received and stored the digital information corresponding to the identity of the particular patient, several advantageous results can be achieved.

Firstly, analysis of the specimen contained in the tube 28 can be performed, and the test results can be manually or automatically entered into the computer 34. Automatic provision of test results from a specimen analyzer to the computer 34 will be discussed below, in conjunction with a description of the specimen analysis system of FIG. 6. Once the computer 34 has been apprised of both the identity of the patient and the test results, a report 38 can be printed via the printer 36.

As a second feature of the inventive method and system, once the identifying information, corresponding to the bar-code information 26 contained on the label 24, has been provided to the computer 34, the printer 36 (or other suitable means) can be employed, under control of the computer 34, to generate additional bar-code labels 48, such as those contained on the sheet 40 of FIG. 2. This is especially advantageous where several samples of a single specimen (the single specimen being contained in the tube 28) are to be tested. That is to say, if a single specimen is received in tube 28, and several tests are to be performed thereon, the specimen in the tube 28 can be separated into several sub-specimens, each can be placed in a separate tube, and each separate tube marked with a respective bar-code label 48 (from the sheet 40), as generated by the printer 36 under the control of the computer 34.

It is also to be understood that, once the computer 34 is provided with a digital representation of the identifying information 26 contained on the label 24, in accordance with the inventive method and system, it is possible for the user to take cognizance of the particular tests requested by the doctor, and to employ the light pen 30 to scan one or more predetermined bar-codes for the purpose of entering, into the computer 34, digital representations (corresponding to pre-determined bar-codes scanned) of the particular tests requested by the doctor. In this manner, the computer 34 can be adapted to generate, via the printer 36, various types of reports or summaries relating to the various tests performed and/or the various test results obtained.

It is also to be understood that, in accordance with the invention, an arrangement similar to that shown in FIG. 2 could be utilized, upon entry of the patient into the hospital, to enter the patient's personal information, together with the patient's bar-code identifier, into the computer 34. That is to say, upon initial entry of the patient, and filling out of the personal history form 10, a light-pen 30 could be used to scan the bar-code identifier 12a contained in the special portion 12 of the form 10 (FIG. 1A), and then other personal history information relating to the patient could be entered into the computer 34 by manual (keyboard) means. In this manner, the computer 34 will be provided with both personal information relating to the patient and the bar-code identifier for the particular patient.

Further use of a copy of the negative 16 can be advantageously utilized as a source document to prepare labels at a site remote from the patient as discussed above.

At some point during or subsequent to entry of the patient into the hospital, the arrangement of FIG. 2 could be utilized to generate bar-code labels (such as bar-code labels 48 of FIG. 2) for affixation to medication containers containing medicine prescribed for the patient. That is to say, once the computer 34 has the bar-code information 12a (from the form 10 of the FIG. 1A) stored therein, the printer 36 can be employed, under control of computer 34, to generate a sheet 40 of labels 48, and these labels 48 can be retained with the medical charts and/or medical history of the patient. Then, whenever a prescription is written by the doctor, a bar-code label 48 can be affixed thereto, and a prescription forwarded to the pharmacy. At the pharmacy, the pharmacist employs a light-pen 30 to scan the bar-code label 48, and thus enters information (into the computer 34) relating to the particular medicine prescribed and issued for the patient. In this manner, the computer 34 keeps a record of the medicine prescribed for the patient during his or her entire stay in the hospital. Moreover, the pharmacist can employ the computer 34 to print out further labels 48 for affixation to the container containing the medicine prescribed for the particular patient.

Figure 3A:
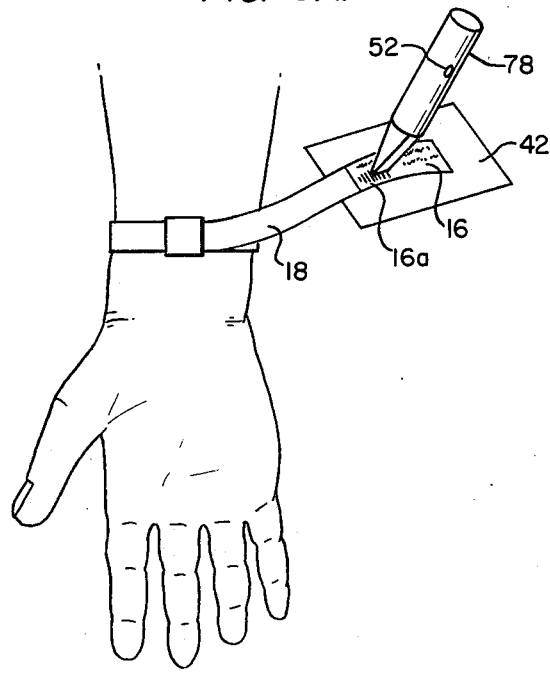
FIGS. 3A and 3B illustrate the medication verification method of the present invention.
Figure 3B:
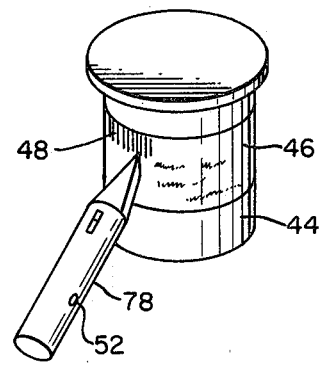

FIGS. 3A and 3B illustrate the medication verification method of the present invention.

Specifically, in accordance with the medication verification method, as previously stated above, the pharmacist implements prescriptions for each patient by issuing medicine contained in a container 44 (FIG. 3B), the container 44 having a conventional label 46, affixed thereto the pharmacist superimposes a bar-code label 48 (obtained from the printer 36 under control of the computer 34 of FIG. 2, as requested by the pharmacist, and as discussed above).

Then, in accordance with the verification method of the present invention, whenever the nurse or other attendant is about to issue medication from the container 44 to the patient, a verification method of the present invention is first carried out. That is, a white or light-colored card 42 is placed under the identifying negative 16 (and thus under the identifying bar-code 16a) attached to the wrist bracelet 18 worn by the patient, and a special, portable light pen scanner 78 is utilized to scan and store the bar-code information 16a contained on the identifying negative 16. Then, the scanner 78 is employed to scan the bar-code identifying information 48 contained on the label 46 affixed to the medicine container 44 (FIG. 3B). At this point in the procedure, the device 78, in a manner to be described in more detail below, makes a comparison between the identifying information represented by the bar-code identifier 16a (FIG. 3A) and the identifying information represented by the bar-code identifier 48 (FIG. 3B). If a positive comparison is achieved, a validation indication to the user is given by lighting of a light 52 contained on the device 78 (or alternatively, sounding of a tone). If a negative comparison is achieved, the negative result is indicated to the user by non-lighting of the light 52 (or, if desired, an additional light (not shown) can be lit for this purpose).

In this manner, according to the medication verification method of the present invention, a direct link between the identity of the patient being treated and the identity of the patient for whom the medication is intended can be achieved, and a comparison is performed to verify that the patient receiving the medication is the same patient for whom the medication is intended.

In addition to the above comparison of a negative wrist bracelet with a positive label can be achieved by coded electronic conversion of the data on the bar coded negative into its positive equivalent for the comparison purposes of the alternative of the inversion of the positive bar code on the container into an electronically coded negative for comparison in the comparator with the wrist bracelet negative scan. Slightly more cumbersome, but still effected, is the preparation of a positive from the negative on the wrist bracelet by the transillumination process followed by comparator comparison of the two positives.

FIGS. 3C and 3D depict the medication verification device of the present invention.

As seen in FIG. 3C, the medication verification device 78 comprises a housing 49 having a control switch 50 and light indicator 52 disposed thereon. The device 78 is further provided with a conventional scanning portion 54, the portion 54 acting in a conventional manner to scan the typical bar-code, and to generate analog signals corresponding thereto. As will be seen below, these analog signals can be converted (by conventional means) into digital form for storage in the device 78.

The switch 50 is preferably a 3-position switch, position 1 corresponding to an "off" position, position 2 corresponding to a "first scan" position, and position 3 corresponding to a "second scan and compare" position. Light indicator 52 indicates a positive comparison result when the switch 50 is in position 3, while non-lighting of the light indicator 52 indicates a negative comparison when the switch 50 is in position 3. Alternatively, a second light indicator (not shown) could be employed to indicate a negative comparison. For example, light indicator 52 could be a green light to indicate positive comparison, while a further light indicator (not shown) could be a red light to indicate a negative comparison. Moreover, as previously mentioned, audible signals or indicators can be employed within the scope of the present invention.

Referring to FIG. 3D, the portable medication verification device of the present invention includes an electronics section 78', including a scanner/converter 60, ganged switches 62 and 64, registers 66 and 68, delay circuit 70, and comparator 72.

Referring to FIGS. 3C and 3D, operation of the medication verification device of the present invention is as follows. When the switch 50 is in position 1 (that is, the "off" position), the device 78 is disabled operationally; that is, the portable miniature battery (conventionally provided with such a device) is disabled. When the switch 50 is moved to position 2 (the "first scan" position), switches 62 and 64 move to position 2, such that the scanner/converter 60 is connected to register 66, and the "ENABLE COMP" input to switch 64 is open-circuited. The "ENABLE COMP" input is provided by conventional means, and comprises (for example) a direct current input to the switch 64.

Thus, with the switch 50 is position 2, the device 78 is utilized to scan the first bar-code, and the resulting optical input is converted to an analog signal, and this is then converted to a digital signal in scanner/converter 60, the resulting digital signal being provided via switch 62 to register 66 wherein it is stored.

When the switch 50 is moved to position 3 (the "second scan and compare" position), switches 62 and 64 move to position 3, and the scanner/converter 60 is connected directly to register 68, while the "ENABLE COMP" input is provided, via delay circuit 70, to enable the comparator 72. The optical input from the second bar code scanned is converted to an analog signal, and this is then converted to digital form by the scanner/converter 60, and the resulting digital information is provided, via switch 62, to register 68 wherein it is stored. Shortly after storage of this information in register 68, the delay circuit 70 provides a delayed "ENABLE COMP" input to the comparator 72, as a result of which the comparator 72 compares the contents of registers 66 and 68. If identity between the registers 66 and 68 is detected, comparator 72 issues a positive comparison output, while, if non-identity between the registers 66 and 68 is detected, a non-comparison output is issued by comparator 72.

Referring to FIG. 3C, the positive comparison output of comparator 72 can be utilized to drive the light indicator 52, resulting in a validation indication to the user of the device. Similarly, the non-comparison output of comparator 72 could, if desired, be used to derive a further light indicator (not shown), so as to indicate lack of validation of the respective bar-codes scanned.

To summarize, as a result of the medication verification method and device of the present invention, the user of the method and device is provided with a rapid, convenient and accurate method for readily verifying, at the bedside of the patient, the fact that the patient is receiving medicine or service which is prescribed for that particular patient. Moreover, the user is provided with a portable, conveniently held medication verification device; in fact, the device can be, in accordance with well-known integrated circuit techniques, designed to be of such a size and shape as to resemble a mechanical pen or pencil, and thus can be carried very conveniently by the user in his or her pocket.

FIGS. 4A-4C illustrate an extension device for use with an aspiration tube, in connection with the specimen analysis method and system of the present invention. FIG. 4D illustrates an integral aspiration tube for alternative use instead of the extension device of FIGS. 4A-4C. FIGS. 5 and 6 are illustrative of the specimen analysis method and system of the invention.

First referring to FIG. 5, the specimen analysis method and system involves the concurrent provision, to a computer or computer system (such as computer 34 of FIG. 2), of both identification information (relating to the identity of the patient from whom the specimen was taken) and analytical test data (resulting from the performance of analytical tests on the specimen taken from the patient).

Prior art specimen analysis methods and systems or devices typically employ an aspiration tube which, along with other aspiration tubes, is placed on a turnstile-type arrangement so that each aspiration tube is successively moved into an aspiration position, wherein an aspirator sucks the liquid out of the aspiration tube into the specimen analyzer for analysis, after which analysis the liquid is returned to the aspiration tube. Conventional techniques and devices are known for analyzing the specimen, converting the results to digital form, and transmitting the results to a digital computer. See, for example, the following U.S. Pat. Nos. 3,832,135; 3,916,157; and 4,133,642.

In accordance with the objective of simultaneously or concurrently providing test result data and identifying information (pertaining to the patient from whom the specimen was taken) to a computer or a computer system, according to the present invention, a laser scanner 94 (FIG. 5) is positioned with respect to the turnstile 90, and more particularly with respect to an aspiration position of the turnstile 90, so as to be able to scan bar-code information associated with a specimen container or aspiration tube 80 as such tube 80 is rotated into the aspiration position.

However, in an effort to achieve this objective (that is, aspiration and analysis of the specimen contained in the aspiration tube 80, concurrently with scanning of bar-code information associated with the aspiration tube 80), a problem was presented to the present inventor. Specifically, bar-code information must be provided to the laser scanner 94 without interfering with the aspiration tube of the specimen analyzer (not shown), which typically enters the aspiration tube 80 from above for the purpose of withdrawing the specimen contained in the aspiration tube 80. A further problem was presented, in that the aspiration tube 80 is typically a very small tube, and thus, if the bar-code information were contained on a label fixed (adhesively) to the side of the aspiration tube 80, the level of the barcode information would be such, relative to the level of scanning of the laser scanner 94, as to preclude efficient scanning by the scanner 94.

Accordingly, the present inventor has developed an extension device, one embodiment of which is illustrated in FIGS. 4A-4C. Referring to the latter figures, the extension device 82 preferably comprises a metal device of generally cylindrical shape, open at both ends, and having a ridge-like portion built up on the inner surface of the device 82 at one end (the lower end) of the device 86. Correspondingly, the aspiration tube 80 is provided with a collar-like formation 84 at the upper end of its cylindrical extension, adjacent to the open top end of the tube 80.

Thus, as illustrated in FIGS. 4A and 4B, the aspiration tube 80 and extension device 82 are assembled by lowering the aspiration tube 80 through the top of the extension device 82 until interlocking contact is made between the collar-like portion 84 of tube 80 and the ridge-like portion 86 of extension device 82 (see, in particular, FIG. 4B).

The extension device 82 is provided with a cut-away section 83 (FIG. 4A) so as to facilitate entry of the aspirator tube of the specimen analyzer (not shown). As the aspirator is lowered into the aspiration tube 80 for the purpose of withdrawing liquid therefrom, the design allows the entry of aspirator from an angle as well as from a vertical trajectory. Moreover, as seen in FIG. 4C, the extension device 82 provides a cylindrical surface to which a machine readable coded label (such as bar-code label 48 of FIG. 2) can be affixed.

It is to be understood that FIGS. 4A-4D illustrate an embodiment of an extension device of the invention. It is to be further understood, however, that the aspiration tube 80 and extension device 82 could be formed into a single integrated arrangement 85, note FIG. 4D, by well-known molding or fusing techniques without exceeding the scope of the present invention.

As seen in FIG. 5, as the aspiration tube 80, with extension device 82 assembled therewith, is rotated into an aspiration position relative to both the aspirator (not shown) and the laser scanner 94, the bar-code label 48 (FIG. 4C) is rotated in front of the laser scanner 94, and the scanner 94 can easily and efficiently scan the bar-code contained on the label 48.

Referring to FIG. 6, the specimen analysis system 100 of the present invention is seen to comprise laser scanner 94, analyzer 102, interface 104, console 106 and computer 108. In operation, once the aspiration tube 80 and the extension device 82 (FIG. 5) are rotated into the aspiration position, the contents of the aspiration tube 80 are withdrawn by the aspirator (not shown), and are analyzed by the analyzer 102, and the latter provides digital output information corresponding to the test results. At the same time, laser scanner 94 scans the machine readable information or bar-code contained on label 48 (FIG. 4C), and provides corresponding digital identification information as an output. The digitized test results and identifying information are provided to a conventional interface 104, and thence to the computer 108. It is to be understood that a console 106 (which is a conventional computer-type console) can be provided and connected to the interface 104, so as to control the operation of the computer 108, as well as the operations of the analyzer 102 and laser scanner 94.

Alternatively, it is contemplated by the present invention that each specimen container may be scanned with a hand held scanner to develop identification data. The scanned specimen container is then placed in a pre-established sequenced position identified to the computer 108. Each tube is then aspirated and its contents analyzed. The analyzer provides digital output information corresponding to the test results. The digitized test results and identifying information are then provided to an interface and the computer.

As a result of the inventive specimen analysis system and method of the present invention, several advantages are achieved. First, speed of analysis of specimens is improved. Second, efficiency of operation is improved, in that both identifying information and test result data are provided concurrently to the computer 108 via the laser scanner 94 and analyzer 102, respectively, thus precluding loss of time for separate provision of this information to the computer 108. Third, accuracy is facilitated in that human intervention is eliminated, and is replaced by high-speed, accurate, electronic provision of both test results and identifying information to the computer. Fourth, the direct linkage between the specimen taken from the patient and the patient's identity is maintained in the specimen analysis portion of the treatment of the patient (as well as in every other procedure carried out with respect to the treatment of the patient, as discussed above), thus precluding, or at least reducing significantly, the chance of error due to erroneous association of a patient with a specimen. Finally, by providing the identifying information and specimen test results to a central computer, a permanent record of the analysis is created, and this contributes to the effectiveness of the overall patient treatment method and system of the present invention, in that a permanent, complete and highly accurate record of the patient's treatment is stored within the computer.

While preferred forms and arrangements have been shown in illustrating the invention, it is to be clearly understood that various changes in detail and arrangement may be made without departing from the spirit and scope of this disclosure.

I claim:

1. A method for the transfer of patient identification to an identifying means which comprises:
    providing a wrist bracelet bearing patient-identifying indicia to be worn by said patient, on which bracelet only the identifying indicia are translucent to ultra-violet;
    providing an ultraviolet sensitive label;
    bringing said label into physical contact with said indicia on said bracelet; and
    transluminating said indicia onto said label by exposure to ultra-violet while said bracelet is on said patient to reproduce said indicia on said label.

2. The method of claim 1, further comprising the step of providing the label with an adhesive backing, and adhesively fixing the label to a container, the container being adapted to hold a specimen taken from the patient.

3. The method of claim 2, wherein said container comprises a blood tube.

4. The method of claim 1, further comprising the step of providing the label with an adhesive backing, and adhesively fixing the label to a document containing information relative to a patient.

5. The method of claim 1, wherein said identifying indicia includes a machine readable code.

6. The method according to claim 1, further comprising the step of providing an ultraviolet-sensitive label, trans-luminating the indicia onto the ultraviolet-sensitive label to create an imprinted label, scanning the imprinted label to develop digital data corresponding thereto, and providing the digital data to a computer.

7. The method of claim 2 wherein said container contains a specimen for analysis from said patient.

* * * * *